United States Patent [19]

Bergström et al.

[11] Patent Number: 5,740,866
[45] Date of Patent: Apr. 21, 1998

[54] HORSESHOE

[75] Inventors: Sten Bergström, Eskilstuna; Ulrik Grennard, Västerås, both of Sweden

[73] Assignee: Cabato AB, Eskilstuna, Sweden

[21] Appl. No.: 765,712

[22] PCT Filed: Jun. 28, 1995

[86] PCT No.: PCT/SE95/00801
§ 371 Date: Dec. 30, 1996
§ 102(e) Date: Dec. 30, 1996

[87] PCT Pub. No.: WO96/01044
PCT Pub. Date: Jan. 18, 1996

[30] Foreign Application Priority Data

Jul. 1, 1994 [SE] Sweden ................. 9402330

[51] Int. Cl.$^6$ ........................ A01L 1/04
[52] U.S. Cl. ........................ 168/12; 168/23
[58] Field of Search ............ 119/12, 13, 23

[56] References Cited

U.S. PATENT DOCUMENTS

| | | | |
|---|---|---|---|
| 1,953,281 | 4/1934 | Veran | 168/13 |
| 2,043,358 | 6/1936 | Swanstrom | 168/13 |
| 2,103,718 | 12/1937 | Goodwin | 168/12 |
| 4,333,532 | 6/1982 | Mennick | 168/24 |
| 5,343,957 | 9/1994 | Chapman | 168/23 X |

FOREIGN PATENT DOCUMENTS 207425  11/1923  United Kingdom.

Primary Examiner—Robert P. Swiatek
Attorney, Agent, or Firm—Birch, Stewart, Kolasch & Birch, LLP

[57] ABSTRACT

A horseshoe having holes for horseshoe nails extending therethrough and including a resilient material. Washers are embedded in the resilient material and horseshoe nails extend through the washers and the holes when the horseshoe is fastened to a horse's hoof. A portion of the horseshoe adapted to bear on the hoof comprises a plate against which the resilient material adheres. The washers abut the plate and are horizontally movable relative thereto, and the holes in the plate have a larger cross section than the nail, such that the nail is capable of moving horizontally together with the washers during loading of the horse's hoof.

7 Claims, 1 Drawing Sheet

HORSESHOE

FIELD OF THE INVENTION

The present invention concerns a horseshoe having holes for horseshoe nails extending therethrough and including a resilient material in which are embedded washers through which the horseshoe nails are intended to extend when the horseshoe is fastened to a horse's hoof.

Each time a moving horse puts down a hoof, the hoof is somewhat expanded due to the pressure exerted on the hoof. When a horse is shod, such expansion is prevented by the hoof being firmly fixed to the shoe. This is an unnatural condition for the horse which may cause pain and restricts the movements of the horse. A majority of horses act at their best when they are unshod. This possibility, however, is strongly restricted.

The object of the present invention, thus, is to provide a horseshoe allowing natural expansion of a horse's hoof when it is loaded. At the same time the horseshoe shall be firmly attached to the hoof.

DESCRIPTION OF THE BACKGROUND ART

GB-A-207,425 discloses a rubber horseshoe molded to the ordinary horseshoe shape and secured to a horse's hoof by nails passed through metal washers embedded in the rubber.

U.S. Pat. No. 4,333,532 discloses a flexible horseshoe of resilient material contoured to fit a hoof as it exists in its natural unshod state. The horseshoe has holes for horseshoe nails molded therein, and the holes are provided with washer-like metal sleeves.

SUMMARY OF THE INVENTION

Based on this background art, the object stated above is achieved in a horseshoe having holes for horseshoe nails extending therethrough and including a resilient material in which are embedded washers through which the nails are extendable when the horseshoe is fastened to a hoof of a horse, the horseshoe comprising a portion of the horseshoe being adapted to bear on the hoof being a plate of a relatively hard material against which the resilient material is attached; the washers abut the plate and are horizontally movable relative thereto; and the holes in the plate having a larger cross section than the nails, such that the nails are movable horizontally together with the washers during loading of the horseshoe characterizing clause of appended claim 1. Embodiments of the invention are stated in the depending claims.

BRIEF DESCRIPTION OF THE DRAWINGS

Preferred embodiments of the present invention will now be described, reference being made to the accompanying drawings which are given by way of illustration only, and thus are not limitative of the present invention, and wherein.

DETAILED DESCRIPTION OF THE PREFERRED EMBODIMENTS

Figure 1:
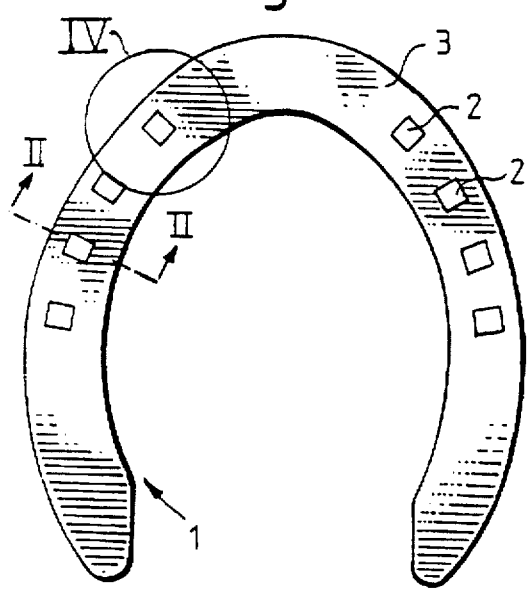
FIG. 1 is a plan view of a horseshoe.

The horseshoe 1 shown in FIG. 1 has the general shape of an ordinary horseshoe. It may have any other suitable shape, such as annular. Holes 2 for horseshoe nails extend through the body of the horseshoe. The holes 2 are preferably rectangular.

According to the present invention, the body of the horseshoe consists of a plate 3, constituting the portion of the horseshoe bearing on the horse's hoof, and a resilient material 4 adhering to the plate 3. The plate 3 is of a relatively hard material such as a metal or a synthetic material.

Further according to the present invention, washers 5 are embedded in the resilient material 4 such that their upper surfaces are substantially flush with the upper surface of the resilient layer and, consequently, abut the lower surface of the plate 3. The washers, thus, adhere to the resilient material, but are free to move relative to the plate 3. It is evident, that such movement involves an elastic compression and expansion, respectively, of the resilient materal around the washers.

Horseshoe nails 6 having conventional conical or wedge-like heads 6' extend through the washers 5 and the holes 2 into a non-shown hoof, and the heads 6' are driven partly into the washers 5.

Figure 4:
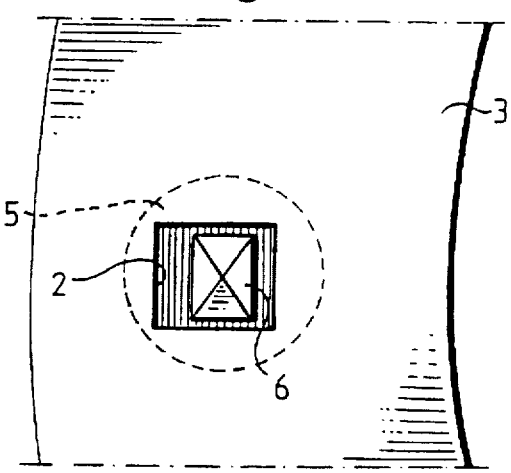
FIG. 4 is a plan view at an enlarged scale of the encircled area IV of FIG. 1.

According to the present invention, the holes 2 have larger cross sectional dimensions than the horseshoe nails 6, particularly their stem portions. Consequently, the nails 6 are free to move horizontally relative to the plate 3 within limits defined by the inner walls of the holes 2 (FIG. 4).

Figure 2:
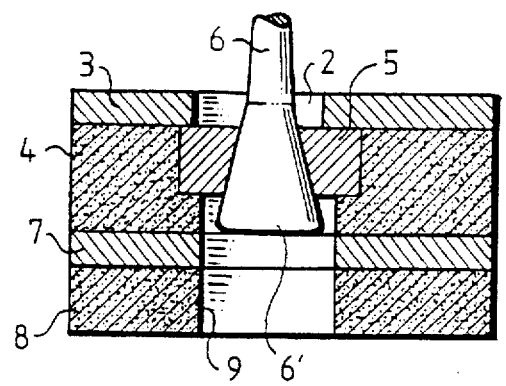
FIG. 2 is a section at an enlarged scale along line II—II of FIG. 1 showing a first embodiment of the horseshoe.

In the embodiment of the present invention shown in FIG. 2, the plate 3 is flat. A further plate 7 of a sutable metal or synthetic material adheres to the resilient material 4 and a layer 8 of a second resilient material adheres to the further plate 7. The layer 8 may be of a resilient material having other hardness than the resilient material 4.

Figure 3:
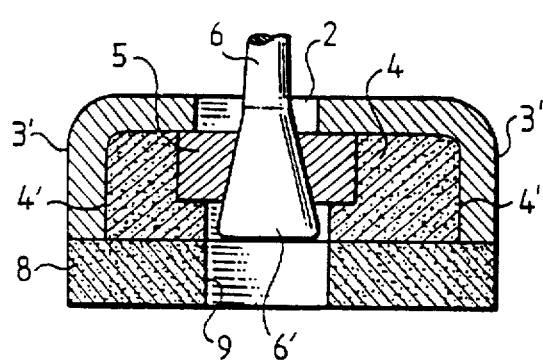
FIG. 3 is a section corresponding to FIG. 2 but showing a second embodiment of the horseshoe.

In the embodiment of the present invention shown in FIG. 3, the plate 3 has an inverted U-shaped cross section. Flanges or edges 3' of the plate are bent down to adhere to lateral surfaces 4' of the resilient material 4. The resilient material 4 may extend below the edges 3', but is shown here to finish substantially flush with the bottom of the edges, where a layer 8 of a second resilient material adheres to the first one. Also in this embodiment, the layer 8 may be of a resilient material having other hardness than the resilient material 4.

Of course, suitable holes 9 are provided in the layer or layers 4, 8 of resilient material to allow introduction of horseshoe nails therethrough.

From the description given above, it is evident that the present invention provides a solution to the problem initially stated in that the horseshoe nails are allowed to move horizontally relative to the horseshoe body, due to the washers being capable of sliding relative to the lower surface of the plate, thus allowing expansion and subsequent contraction of a horse's hoof, while the horseshoe still is firmly attached to the hoof. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A horseshoe having holes for horseshoe nails extending therethrough and including a resilient material in which are embedded washers through which the nails are extendable when the horseshoe is fastened to a hoof of a horse, the horseshoe comprising:

a portion of the horseshoe being adapted to bear on the hoof being a plate of a relatively hard material against which the resilient material is attached;

the washers abut the plate and are horizontally movable relative thereto; and the holes in the plate having a larger cross section than the nails, such that the nails are movable horizontally together with the washers during loading of the horseshoe.

2. The horseshoe according to claim 1, wherein the plate is made from metal or synthetic material.

3. The horseshoe according to claim 1, wherein the holes in the plate are rectangular.

4. The horseshoe according to claim 1, wherein the resilient material is present in more than one layer.

5. The horseshoe according to claim 4, wherein the layers have different hardnesses.

6. The horseshoe according to claim 4, further comprising a further plate interposed between two layers of the resilient material.

7. The horseshoe according to claim 1, wherein the plate has an inverted U-shaped cross section with edges bent down around the resilient material.

* * * * *